Oct. 6, 1936. K. E. KYLÉN 2,056,901
LUBRICATING SYSTEM FOR RECIPROCATING MACHINES
Filed Nov. 3, 1932 2 Sheets-Sheet 1

INVENTOR
KARL ERIK KYLÉN
BY
his ATTORNEY

Oct. 6, 1936.  K. E. KYLÉN  2,056,901
LUBRICATING SYSTEM FOR RECIPROCATING MACHINES
Filed Nov. 3, 1932  2 Sheets-Sheet 2
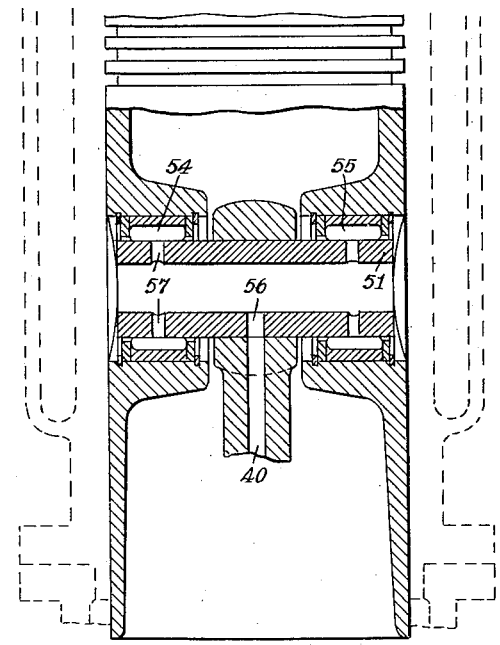
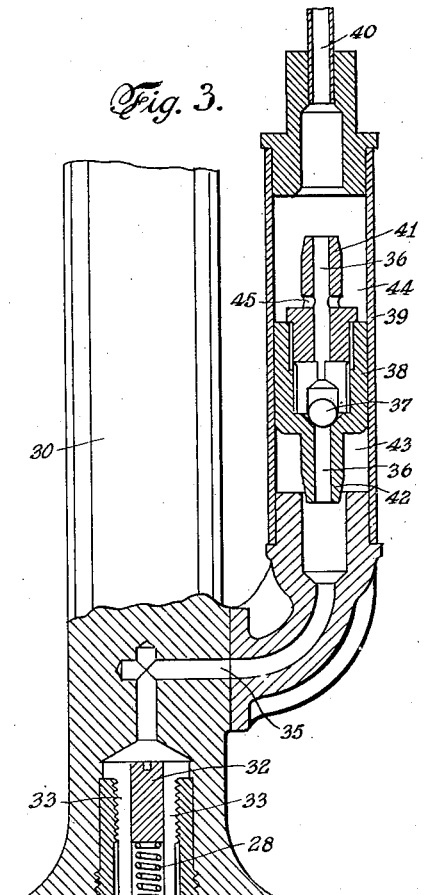
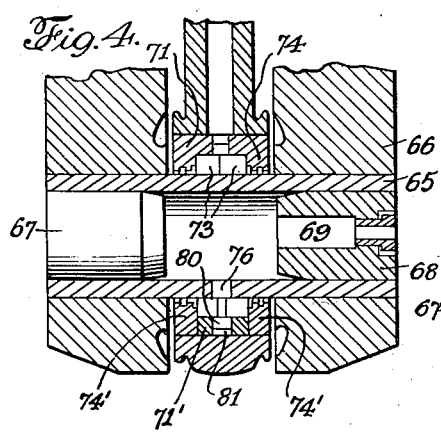
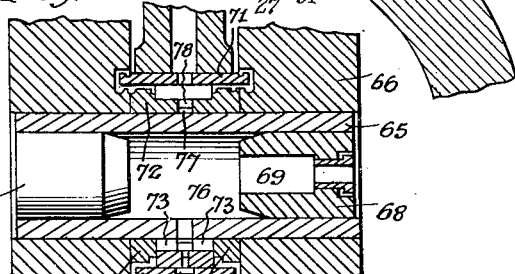
INVENTOR
KARL ERIK KYLÉN
BY
ATTORNEY Patented Oct. 6, 1936

2,056,901

UNITED STATES PATENT OFFICE 2,056,901

LUBRICATING SYSTEM FOR RECIPROCATING MACHINES

Karl Erik Kylén, Goteborg, Sweden, assignor to Aktiebolaget Svenska Kullagerfabriken, Goteborg, Sweden, a corporation of Sweden Application November 3, 1932, Serial No. 640,952
In Sweden November 4, 1931

8 Claims. (Cl. 184—6)

The present invention relates to lubricating systems for reciprocating machines and consists mainly in the provision of a closed channel connecting the crank pin bearing with the cylinder wall, through which channel oil from the bearing is conducted to the cylinder. According to a special form of the invention the closed channel passes through and includes the gudgeon pin bearing, or the cross head bearing, and is extended through the crank to connect with one or more of the crank shaft bearings.

One object of my invention is to provide a lubricating system which will avoid the drawbacks connected with splash lubrication from the crank chamber. All the bearings, and the cylinder, are lubricated with fresh, unsoiled oil free from abrasive particles, which in the ordinary lubricating systems are carried into the oil supply along with oil from the cylinder, and free from water, soot and the like from the combustion gases of internal combustion engines.

Another object of my invention is, therefore, to diminish the wear on the movable parts of the machine.

A further object of my invention is to provide a reliable method of lubricating the cylinder, and one in which lubricant will be supplied to the cylinder during the whole stroke of the piston. This provides a more effective lubricating of the cylinder, and especially the upper part thereof. According to the invention oil is supplied to the lubricating system only in the amount required, and all refilling of oil in the crank chamber, with attendant disadvantages, is avoided. A considerable saving in lubricant is thereby obtained, as, when refilling oil in the crank chamber, considerable quantities of oil which have not entirely lost their lubricating value must be sacrificed with the spoiled oil. Finally the expense and trouble attendant on a change of oil are avoided.

Other objects of the invention and details of construction will be set forth and fully explained in the description which follows:

The accompanying drawings illustrate several forms of the invention.

Figure 1 is a vertical section through the cylinder and crank chamber of a motor and in which the cylinder is lubricated with oil from one of the main anti-friction bearings and the crank pin anti-friction bearing, the channel for conducting the oil to the cylinder passing through the gudgeon pin anti-friction bearing. One of the main bearings is, in the illustration, intended to be lubricated with grease.

Figure 2 shows a section through the piston and cylinder of a motor in which the cylinder is lubricated partly from the gudgeon bearing and partly from the crank pin bearing, through the hollow gudgeon pin.

Figure 3 shows on a large scale a pumping device for raising oil to the cylinder and Figures 4 and 5 show other forms of crank pin bearings.

Figure 1:
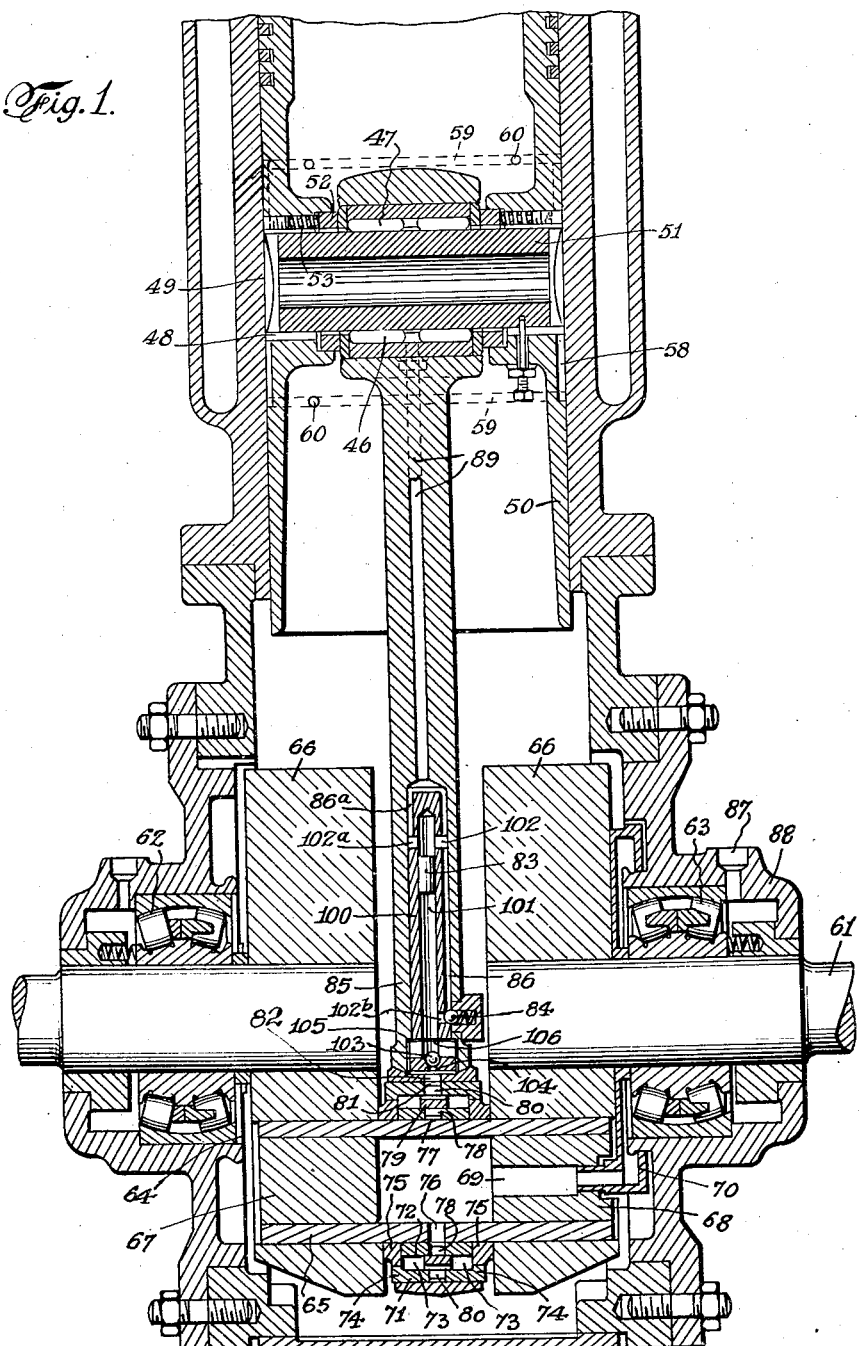

In the form of the invention illustrated in Fig. 1 the crank shaft 61 is mounted in roller bearings 62 and 63, of which the bearing 62 is lubricated with grease, which is prevented from escaping to the crank chamber by a shield 64. In order to permit of the application of the anti-friction bearing illustrated on the crank the crank shaft is of built-up type. The crank pin 65 is for this reason made hollow and is fixed to the webs 66 by means of plugs 67 and 68, driven into the crank pin. One of the plugs 68 nearest the bearing 63 is provided with a through channel 69 which at its outer end opens into a lubricating ring 70. On the crank pin is mounted a roller bearing comprising an outer race 71, an inner race 72, and two sets of rollers 73. The outer race is provided with inwardly directed flanges 74, the inner cylindrical surfaces of which very nearly engage the outer cylindrical surfaces of guiding and sealing rings 75, applied between the inner race 72 and the webs 66. The interior of the crank pin communicates through a radially arranged channel 76 with a circular distributing channel 77, formed in the bearing race 72. A number of radial holes 78 lead from the channel 77 to the interior of the bearing. A ring 79 is located between the sets of rollers and serves the dual purpose of guiding the rollers and distributing the oil entering through the holes 78 between the sets of rollers. A number of radial holes 80 are arranged in the outer race of the bearing opening into an annular collecting channel 81. The oil is raised from the channel 81, through a hole 82 in the connecting rod big end, by a pump device, being mounted in the cylinder 101 formed in the connecting rod 85. One of the valves 84 is shown mounted direct in the connecting rod 85 for op' ling and closing a channel 86 upon movement of the piston 83. Oil entering the housing 88 of the bearing 63 through the opening 87, after having lubricated the bearing 63, collects in the lubricating ring 70 and enters the crank pin through the opening 69. The oil then passes through the hole 76 to the distributing channel 77, and further through the radial channels 78, to the bearing. After having lubricated the crank pin bearing the oil passes through the radial channels 80 and the collecting channel 81 to the hole 82, from which it is raised by means of the pump device in the connecting rod to the channel 89. From this channel the oil flows further to the gudgeon pin bearing or cross head bearing 47 and to the cylinder, being prevented from passing back to the crank pin by ball 103 seating against seat 104. On the return stroke of the piston 83 the oil is trapped in channel 86, 86a and 86b by the action of the valve 84 and finds its way under the influence of further injections of oil into channel 89.

A second non-return valve is arranged at the end of the liner 100 adjacent the hole 82 and comprising a ball 103 disposed between a seating 104 and cross piece 105 having a center hole 106 communicating with the interior of the pump cylinder.

In addition as the piston 83 moves downwards, a mixture of oil and air will be drawn through the port 102 at the right into the cylinder 101 and will be pressed outwards and upwards through the ports 102 and 102a when the piston moves upwards again. A part of the oil mist and air will be trapped in that part of the cylinder above the cross passages. Due to the elasticity of this mixture it acts as a cushion which prevents the piston from hitting the top of the cylinder. A similar effect is obtained at the bottom of the cylinder as mixture is also trapped below the port 102b as the piston moves downwards. This cushioning effect is obtained by locating the ports at a distance from the ends of the cylinder.

An alternative pumping device for raising the oil from the crank pin bearing to the gudgeon pin bearing and the cylinder is illustrated in Fig. 3. Raising means, comprising a ball valve and a pumping device, are provided for this purpose on the connecting rod. The ball valve comprises a ball 27 which is pressed against a valve seat 29 by a spring 28. The valve seat 29 is formed in a sleeve 31 screwed into the connecting rod 30. A plug 32 is screwed into the sleeve 31 and is provided with axially extending channels 33 through which the oil passes. The plug 32 serves also to hold the spring 28 in position. During the movement of the connecting rod the ball will be alternately lifted from, and pressed against the valve seat, and oil will be raised through the opening 34 past the ball and up into the channels 33 and further into the channel 35. A special pump device is provided to aid in lifting the oil past the ball 27 and to raise it further. The pump device comprises a cylindrical body or piston 38 having a through channel 36 and a ball valve 37. The piston 38 is axially slidable in a cylinder 39 and will be thrown up and down in the cylinder upon the movement of the connecting rod. In order to damp the shocks projections 41 and 42 are arranged at the ends of the piston. These projections alternately close the channels 35 and 40, thus forming air cushions in the annular spaces 43 and 44. Upon the upward movement of the piston 38 a mixture of air and oil is drawn past ball 27 into the channel 35. At the same time the air and oil already in the chamber 44 and the channel 40 is forced upwards to the gudgeon pin bearing and the cylinder. In order to permit the air and oil to escape from the chamber 44 a cross channel 45 is provided communicating with the channel 36. The area of the channel 45 is sufficiently small not to seriously impede with the air cushioning. Upon downward movement of the piston 38 the air and oil is pressed from the channel 35 past the ball valve 37.

The whole device, therefore, forms a pump driven by the dynamic forces generated upon the movement of the connecting rod. The device raises the oil quickly to the cylinder. If, on the other hand, only a ball valve 27 is provided, the whole channel above this valve must be filled with oil before any oil will be supplied to the cylinder. If the channel is empty, which will be the case when the machine is started after having stood still some time, it would require some time before the oil reached the cylinder. This drawback is, however, avoided with the above mentioned pump device.

The channel 40 is either connected to the gudgeon pin bearing, as shown in Fig. 1, or to the hollow gudgeon pin, as shown in Fig. 2. The first mentioned alternative is most suitable when the gudgeon pin bearing is located between the gudgeon pin and the connecting rod as in Fig. 1, and the second alternative when the bearings are in the piston, as in Fig. 2.

In the form of the invention illustrated in Fig. 1 the channel 89 communicates with the gudgeon pin bearing housing 46. Oil is conducted to the bearing through the channel 89, and after having lubricated the gudgeon pin bearing 47, passes out through one or more closed channels 48 to the cylinder wall 49. The channel 48 may be formed either in the piston 50 as shown, or in the gudgeon pin 51, or both. To prevent the oil from leaking out at the joint between the gudgeon pin bearing housing and the piston a seat is provided, comprising a sealing ring 52 carried by a cylindrical seat in the piston. The sealing ring 52 is pressed against the connecting rod by springs 53. The air and oil raised by the pump device pass through grooves 58 extending axially along the piston to grooves 59 extending around the circumference of the piston, from which the air passes back into the piston through the holes 60.

In the form of the invention illustrated in Fig. 2 the gudgeon pin bearings 54 and 55 are contained in the piston. Lubricant enters the hollow gudgeon pin through a hole 56 from the channel 40. Part of the lubricant then passes directly to the cylinder and part through holes 57 to the gudgeon pin bearings, from which a part of it finally finds its way to the piston.

Figure 4 shows in its upper and its lower halves respectively two forms of the invention. In these forms the inner bearing ring 72, the distributing channel 77, the radial channel 78 and the rings 75 of the Figure 1 form of construction have been dispensed with, the rollers 73 being shown as rolling directly on the crankpin 65. In the form illustrated in the upper half of the figure, the flanges 74 are shown formed in one piece with the outer race 71 and as having sealing surfaces adjacent the crankpin 65. In the form shown in the lower half of the figure, the flanges 74' are shown as parts formed separate from the outer race 71'.

Figure 5 illustrates in its upper and its lower halves respectively, two forms of the invention. In these forms sealing rings 75 have been extended to the inner cylindrical surface of the outer bearing race 71. In the form illustrated in the lower half of the figure, special sealing rings 90 are provided which are pressed against the webs 66 by means of springs 91. The sealing rings 90 therefore have sealing surfaces abutting against the webs and against the outer cylindrical surface of the outer race 71. In the form illustrated in the upper half of the figure, the flanges 72 are shown formed integral with the inner bearing race. In both the Figure 4 and Figure 5 constructions the oil finds its way into the interior of the hollow crank pin 65 in substantially the same manner as it does in the Figure 1 construction.

The invention is not confined to the forms illustrated, but can be applied in a number of ways without departing from the spirit of the invention. In machines having a piston rod and cross head the oil may be supplied to the cross head bearing instead of to the gudgeon pin bearing. The oil may then be supplied to the cylinder from the cross head bearing through channels in the piston rod and piston.

I claim:

1. In a lubricating system for reciprocating machines, the combination with a frame having a piston cylinder, of a piston furnished with a gudgeon pin and mounted in the cylinder, an antifriction bearing on the gudgeon pin, a connecting rod having a portion surrounding such antifriction bearing, and a sealing device between the connecting rod and the piston, the said sealing device surrounding the pin and abutting against the connecting rod and against the piston, the sealing device consisting of a ring disposed in an annular seat formed in one of these parts and having a surface forming one side of a channel extending along the gudgeon pin, and spring means serving to press the said sealing device against its seat.

2. In a lubricating system for reciprocating machines, the combination with a frame having a piston cylinder, of a piston furnished with a gudgeon pin and mounted in the cylinder, an antifriction bearing on the gudgeon pin, a connecting rod having a portion surrounding such antifriction bearing, and a sealing device between the connecting rod and the piston, the said sealing device surrounding the pin and abutting against the connecting rod and against the piston, the sealing device consisting of a ring disposed in an annular seat formed in one of these parts and having a surface forming one side of a channel extending along the gudgeon pin, spring means serving to press the said sealing device against its seat, a crank pin, an antifriction bearing mounted thereon and sealing devices disposed on both sides of the antifriction bearing, there being an oil channel associated with the connecting rod for interconnecting the gudgeon pin channel and the crank pin bearing.

3. In a lubricating system for reciprocating machines, the combination with a frame having a piston cylinder, of a piston furnished with a gudgeon pin and mounted in the cylinder, an antifriction bearing on the gudgeon pin, a connecting rod having a portion surrounding such antifriction bearing, and a sealing device between the connecting rod and the piston, the said sealing device surrounding the pin and abutting against the connecting rod and against the piston, the sealing device consisting of a ring disposed in an annular seat formed in one of these parts and having a surface forming one side of a channel extending along the gudgeon pin, a crank pin, a roller bearing mounted thereon and having flanges for guiding the rollers in the bearing, such guide flanges being disposed and adapted to form sealing devices for the bearing, there being an oil channel interconnecting the gudgeon pin channel and the crank pin bearing.

4. In a lubricating system for reciprocating machines, the combination with a frame having a piston cylinder, of a piston furnished with a gudgeon pin and mounted in the cylinder, an antifriction bearing on the gudgeon pin, a connecting rod having a portion surrounding such antifriction bearing, and a sealing device between the connecting rod and the piston, the said sealing device surrounding the pin and abutting against the connecting rod and against the piston, the sealing device consisting of a ring disposed in an annular seat formed in one of these parts and having a surface forming one side of a channel extending along the gudgeon pin, spring means serving to press the said sealing device against its seat, a crank pin, an antifriction bearing mounted thereon and sealing device disposed on both sides of the antifriction bearing, the sealing device being intended to seal against the crank pin, there being an oil channel associated with the connecting rod for interconnecting the gudgeon pin channel and the crank pin bearing.

5. In a lubricating system for reciprocating machines, the combination with a frame having a piston cylinder, of a piston furnished with a gudgeon pin and mounted in the cylinder, an antifriction bearing on a gudgeon pin, a connecting rod having a portion surrounding such antifriction bearing, and a sealing device surrounding the pin and abutting against the connecting rod and against the piston, the sealing device consisting of a ring disposed in an annular seat formed in one of these parts and having a surface forming one side of a channel extending along the gudgeon pin, spring means serving to press the said sealing device against its seat, a crank pin, an antifriction bearing mounted thereon and sealing devices disposed on both sides of the antifriction bearing, the sealing devices being extended to seal against the internal surface of the inner race ring of the antifriction bearing, there being an oil channel associated with the connecting rod for interconnecting the gudgeon pin channel and the crank pin bearing.

6. In a lubricating system for reciprocating machines the combination with a frame having a piston cylinder, a piston furnished with a gudgeon pin and mounted in the cylinder, an antifriction bearing on the gudgeon pin, a connecting rod having a portion surrounding such antifriction bearing, and an annular sealing device between the connecting rod and the piston, the said sealing device surrounding the gudgeon pin and abutting with one surface against the connecting rod and with another surface against the piston, and with its inner surface forming one side of a channel extending axially along the gudgeon pin.

7. A lubricating system according to claim 6, characterized by lifting means associated with the connecting rod and operated by the movement of the connecting rod, for raising the lubricant to the cylinder.

8. In a lubricating system for reciprocating machines the combination with a frame having a piston cylinder, main bearing housings, and a seat for a pair of main crankshaft bearings formed in the housings, of a crankshaft having a crankpin portion and two main bearing seats, a pair of main antifriction crankshaft bearings located in the main bearing housing seats and mounted on the crankshaft seats, an antifriction bearing mounted on the crankpin, a piston located in the cylinder and carrying a wrist pin, an antifriction bearing mounted on the piston wrist pin, a connecting rod having portions surrounding the crankpin bearing and the wrist pin, means for forcing lubricant between the races of at least one of the main bearings and thence between the races of the crankpin bearing, means for forcing a portion of the lubricant from the crankpin bearing to the piston pin bearing and between the piston and the cylinder, whereby lubricant is conducted from the main crankshaft bearing to the cylinder walls through a series of bearings in the order named, all of such bearings being of the antifriction type.

KARL ERIK KYLÉN.